April 29, 1924.
F. H. RENSHAW
FERTILIZER DISTRIBUTOR
Filed Aug. 15, 1923
1,492,267
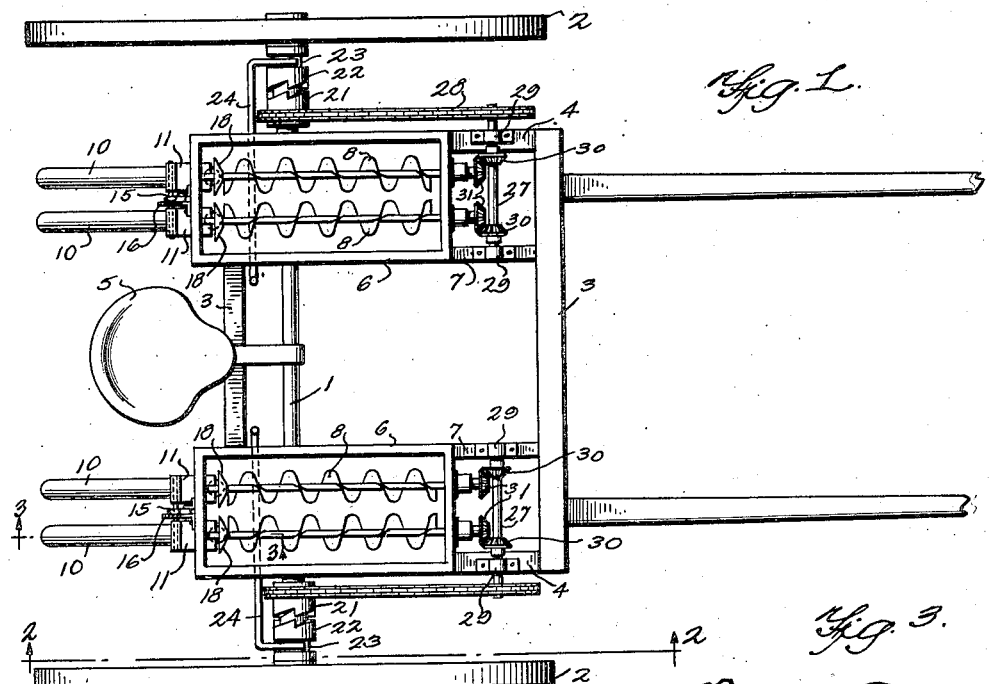
Inventor
Frederic H. Renshaw;
By
Attorney Patented Apr. 29, 1924.

1,492,267

UNITED STATES PATENT OFFICE.

FREDERIC H. RENSHAW, OF BALTIMORE, MARYLAND.

FERTILIZER DISTRIBUTOR.

Application filed August 15, 1923. Serial No. 657,595.

*To all whom it may concern:*

Be it known that I, FREDERIC H. RENSHAW, a citizen of the United States, residing at Baltimore, and State of Maryland, have invented certain new and useful Improvements in Fertilizer Distributors, of which the following is a specification.

This invention relates to fertilizer distributors and more particularly to such a device adapted for dropping narrow lines of fertilizer upon opposite sides of furrows.

An important object of the invention is the provision of a fertilizer distributor employing hoppers for the fertilizer, outlet pipes for distributing the fertilizer, valves for controlling discharge of the material and means for preventing the fertilizer in the hoppers from clogging at the outlets.

Other objects and advantages of the invention will be apparent during the course of the following description.

In the accompanying drawings I have shown one embodiment of the invention. In this showing, Figure 1 is a plan view, Figure 2 is a side elevation, Figure 3 is a section taken on line 3—3 of Figure 1, and, Figure 4 is a detail view of the breaker member.

Referring to the drawings, the numeral 1 designates an axle having traction wheels 2 mounted thereon. The frame of the distributor comprises transverse bars 3 and longitudinal bars 4. An operator's seat 5 is mounted upon the frame as shown in Figure 1.

In carrying out my invention I prefer to provide a pair of hoppers 6 arranged upon opposite sides of the frame as clearly shown in Figure 1. Supplementary longitudinal bars 7 are provided within the longitudinal bars 4 and the hoppers are mounted upon the bars 4 and 7 and secured thereto in any suitable manner. Each hopper is preferably provided with a pair of spiral conveyors 8 adapted to feed the fertilizer or other material rearwardly toward outlets 9. The outlets communicate with pipes 10 and slide valves 11 are arranged over the outlets 9 to govern the amount of material discharged through the pipes 10 at the will of the operator. As shown in Figure 1 a discharge pipe is provided for each of the spiral conveyors 8, the discharge 9 in each case being arranged near the rear end of the box as shown in Figure 3. The valves 11 in each box are connected at their rear ends by bars 12 and a lever 13 is connected with these bars between the valves of each hopper. The levers 13 are pivoted intermediate their ends as at 14 and are provided upon their upper ends with operating handles 15. Each lever is provided adjacent its upper end with a stationary quadrant 16 adapted to be engaged by suitable latch mechanism 17 for maintaining the valves 11 in any desired position.

In fertilizer distributors heretofore employed, having a force feed conveyor, there has been a tendency to feed the material toward the outlet at a greater rate of speed than it is permitted to be discharged through the outlet, particularly when the valves are partially closed, causing an accumulation of material at the rear end of the box thus exerting a pressure against the rear wall as will be obvious. This pressure often results in the weakening of the rear walls of the hopper, and when the latter are wholly filled with material, there is a tendency for the material to pile up in the center of each hopper and overflow the rear wall. To overcome this objection I provide a breaker member 18 comprising a central hub 19 secured to the shaft of each spiral conveyor as shown in Figure 3. Each breaker is formed with a plurality of inclined intersecting triangular faces 20, as shown in Figure 3. Each of the breaker members 18 is mounted with its edges arranged slightly above and adjacent one of the outlets 9.

Any suitable means may be employed for driving the conveyors 8. As shown, a clutch member 21 is freely mounted upon the axle adjacent each of the hoppers. These clutch members are free to rotate upon the axle but are incapable of longitudinal movement. A second clutch member 22 is arranged adjacent each of the free clutch members 21 and is keyed to revolve with the axle but is capable of longitudinal movement. Each clutch member 22 is provided with a groove 23 receiving the forked end of a lever 24. The opposite end of each lever 24 extends to a point adjacent the driver's seat for ease of operation, as shown in Figure 1. When the clutch members are engaged the free member 21 rotates with the axle as will be obvious. As shown in Figure 2, each of the free members 21 is provided with a sprocket 25 arranged in alinement with a similar sprocket 26 mounted upon a shaft 27. A chain 28 passes over the sprockets to drive each of the shafts 27. As shown in Figure 1, each of the shafts 27 is mounted in suitable bearings 29 arranged upon the longitudinal bars 4 and 7. Bevel gears 30 are mounted upon each of the shafts 27 and these gears mesh with bevel gears 31 arranged on the shafts of the spiral conveyors 8. As will be obvious from Figure 1, the spiral conveyors in each hopper will be revolved in opposite directions when the clutch members are engaged to feed the material toward the center of the box so that it will be continuously agitated and retained in the path of the conveyors.

The operation of the device is as follows:

The spiral conveyors 8 are of sufficient pitch and size to feed material rearwardly toward the discharge openings 9 to permit a full discharge of material to the outlet pipes 10 when it is desired. When a lesser amount of fertilizer is to be distributed, the valves 11 may be partially closed by moving the handle 15 upon releasing the latches 17. When this is done material will be fed rearwardly toward the discharge openings at a greater rate than it will be discharged through the pipes 10. Rotation of the breaker member 18 tends to throw the rearwardly moving material outwardly in all directions from the shaft of each spiral conveyor. The material is thus prevented from packing against the rear wall of the hopper as will be obvious. At the same time the angular arrangement of the faces of the member 18 is such that the lower portion thereof tends to direct material into the discharge opening 9 so that it will be discharged freely. When the device is not in operation, the valves 11 may be wholly closed without disengaging the clutches and without danger of the material packing against the rear walls of the hoppers.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. The combination with a distributing machine comprising a hopper adapted to contain the material to be distributed, said hopper having the discharge opening adjacent one end, and means for moving the material horizontally toward said opening, of a breaker member mounted within and adjacent the end wall of said hopper adjacent said discharge opening and rotatable about a horizontal axis, said breaker member having a plurality of inclined intersecting faces surrounding said axis.

2. The combination with a distributing machine comprising a hopper adapted to contain the material to be distributed, said hopper having a relatively small discharge opening adjacent one end, a spiral conveyor including a shaft journaled in said hopper and adapted to move the material therein horizontally toward said opening, and means for rotating said shaft, of a breaker member arranged within and adjacent the end wall of said hopper and fixed to said shaft to rotate therewith, said breaker member comprising a plate having a plurality of intersecting inclined faces surrounding said shaft and having its smaller end arranged toward said conveyor and its larger end arranged adjacent said discharge opening.

3. The combination with a distributing machine comprising a hopper adapted to contain the material to be distributed, said hopper having a relatively small discharge opening adjacent one end, a spiral conveyor including a shaft journaled in said hopper and adapted to move the material therein horizontally toward said opening, means for rotating said shaft, and a valve for controlling passage of material through said opening, of a polygonal breaker member arranged within and adjacent the end wall of said box and surrounding and fixed to said shaft to rotate therewith, said breaker member having its smaller end arranged toward said conveyor and its larger end arranged adjacent said discharge opening.

In testimony whereof I affix my signature in presence of two witnesses.

FREDERIC H. RENSHAW.

Witnesses:
CLINTON S. HANCOCK,
SOPHIE J. PICKETT.